(12) United States Patent
Wang et al.

(10) Patent No.: US 11,936,024 B2
(45) Date of Patent: Mar. 19, 2024

(54) BATTERY PACK, METHOD FOR PRODUCING BATTERY PACK AND VEHICLE

(71) Applicant: CONTEMPORARY AMPEREX TECHNOLOGY CO., LIMITED, Fujian (CN)

(72) Inventors: Peng Wang, Fujian (CN); Kaijie You, Fujian (CN); Mu Qian, Fujian (CN); Haizu Jin, Fujian (CN); Xingdi Chen, Fujian (CN); Jun Ma, Fujian (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 598 days.

(21) Appl. No.: 15/734,355

(22) PCT Filed: May 20, 2020

(86) PCT No.: PCT/CN2020/091293
§ 371 (c)(1),
(2) Date: Dec. 2, 2020

(87) PCT Pub. No.: WO2020/248785
PCT Pub. Date: Dec. 17, 2020

(65) Prior Publication Data
US 2021/0265679 A1   Aug. 26, 2021

(30) Foreign Application Priority Data

Jun. 10, 2019 (CN) .......................... 201910497140.7

(51) Int. Cl.
| | | |
|---|---|---|
| *H01M 10/6556* | (2014.01) | |
| *H01M 10/613* | (2014.01) | |
| *H01M 10/615* | (2014.01) | |
| *H01M 10/625* | (2014.01) | |
| *H01M 10/647* | (2014.01) | |
| *H01M 10/6567* | (2014.01) | |
| *H01M 10/658* | (2014.01) | |

(52) U.S. Cl.
CPC ..... *H01M 10/6556* (2015.04); *H01M 10/613* (2015.04); *H01M 10/615* (2015.04); *H01M 10/625* (2015.04); *H01M 10/647* (2015.04); *H01M 10/6567* (2015.04); *H01M 10/658* (2015.04); *H01M 2220/20* (2013.01)

(58) Field of Classification Search
CPC .......... H01M 10/6556; H01M 10/613; H01M 10/615; H01M 10/625; H01M 10/647; H01M 10/6567; H01M 10/658; H01M 2220/20; H01M 50/209; H01M 10/617; H01M 10/6554; Y02E 60/10
See application file for complete search history.

(56) References Cited

U.S. PATENT DOCUMENTS

| | | | |
|---|---|---|---|
| 10,326,184 B2 | 6/2019 | Kimura | |
| 2011/0300433 A1* | 12/2011 | Kim | H01M 50/296 |
| | | | 429/159 |
| 2014/0356662 A1 | 12/2014 | Yang et al. | |
| 2015/0171486 A1* | 6/2015 | Rawlinson | H01M 10/613 |
| | | | 324/426 |
| 2015/0280209 A1* | 10/2015 | Ohara | H01M 4/13 |
| | | | 429/94 |
| 2016/0190662 A1 | 6/2016 | Kimura | |
| 2020/0287179 A1 | 9/2020 | Wang et al. | |
| 2020/0358049 A1 | 11/2020 | Shi et al. | |
| 2021/0119290 A1 | 4/2021 | Shi et al. | |

FOREIGN PATENT DOCUMENTS

| | | |
|---|---|---|
| CN | 103597653 A | 2/2014 |
| CN | 105742751 A | 7/2016 |
| CN | 205960072 U | 2/2017 |
| CN | 206271772 U | 6/2017 |
| CN | 107665961 A | 2/2018 |
| CN | 207409555 U | 5/2018 |
| CN | 108565524 A | 9/2018 |
| CN | 109461859 A | 3/2019 |
| DE | 102016212273 A1 | 1/2018 |
| EP | 2393140 A1 | 12/2011 |
| EP | 3706189 A1 | 9/2020 |
| EP | 3736879 A1 | 11/2020 |
| IN | 107078245 A | 8/2017 |
| JP | 2010123298 A | 6/2010 |

\* cited by examiner

*Primary Examiner* — Muhammad S Siddiquee
(74) *Attorney, Agent, or Firm* — Scully, Scott, Murphy & Presser, P.C.

(57) ABSTRACT

The present application provides a battery pack, a method for producing a battery pack and a vehicle. The vehicle includes a vehicle body and a battery pack, the battery pack being disposed in the vehicle body. The battery pack includes a battery module and a case. The case has a containing chamber, and the battery module is located in the containing chamber. The battery module includes a plurality of battery units arranged in a horizontal direction, and each battery unit at least includes one battery cell. A size of the battery module in the horizontal direction is larger than a size of the battery module in a vertical direction. The size of the battery module in the vertical direction is $L_1$, and a size of the battery pack in the vertical direction is $L_2$, where $70\% \leq L_1/L_2 \leq 95\%$.

13 Claims, 5 Drawing Sheets

BATTERY PACK, METHOD FOR PRODUCING BATTERY PACK AND VEHICLE

CROSS-REFERENCE TO RELATED APPLICATIONS

This application is a national stage of International Application No. PCT/CN2020/091293, filed on May 20, 2020, which claims priority to Chinese Patent Application No. 201910497140.7, filed on Jun. 10, 2019. Both of the aforementioned applications are hereby incorporated by reference in their entireties.

TECHNICAL FIELD

The present application relates to the field of batteries, and in particular, to a battery pack, a method for producing a battery pack and a vehicle.

BACKGROUND

A secondary battery has advantages of high energy density, long service life, energy saving, environment protection and the like, and is widely applied to different fields such as new energy automobiles and energy storage power stations. A battery pack usually serves as a power source of an automobile, and the battery pack includes a case and a plurality of batteries housed in the case. However, a temperature of the case is easily affected by an external temperature, and correspondingly, a temperature of the battery is also affected by the temperature of the case. In the known technology, a temperature of a battery is greatly affected by a temperature of a case, which results in unstable control of the temperature of the battery, and affects performance of the battery.

SUMMARY

In view of the problem in the background, an objective of the present application is to provide a battery pack, a method for producing a battery pack and a vehicle, which could reduce the influence of an external environment on a temperature of a battery, and improve an adjustment and control effect of the temperature of the battery.

To achieve the foregoing objective, the present application provides a battery pack and a vehicle.

The battery pack includes a battery module and a case. The case has a containing chamber, and the battery module is located in the containing chamber. The battery module includes a plurality of battery units arranged in a horizontal direction, and each battery unit at least includes one battery cell. A size of the battery module in the horizontal direction is larger than a size of the battery module in a vertical direction. The size of the battery module in the vertical direction is $L_1$, and a size of the battery pack in the vertical direction is $L_2$, where $70\% \leq L1/L2 \leq 95\%$.

In some embodiments of the present application, the battery cell includes an electrode assembly, a housing and a top cover assembly, the electrode assembly is housed in the housing, and the top cover assembly is connected to the housing. The housing includes two first side walls and two second side walls, the first side walls face each other in the vertical direction, the second side walls face each other in the horizontal direction, and an area of the first side wall is larger than an area of the second side wall.

In some embodiments of the present application, each battery unit includes a plurality of battery cells stacked in the vertical direction.

In some embodiments of the present application, the electrode assembly includes a first electrode sheet, a second electrode sheet and a diaphragm, and the diaphragm isolates the first electrode sheet from the second electrode sheet. The first electrode sheet, the diaphragm and the second electrode sheet are coiled into a flat shape, or the first electrode sheet, the diaphragm and the second electrode sheet are stacked in the vertically direction. The electrode assembly has two wide surfaces and two narrow surfaces, the wide surface and the first side wall face each other in the vertical direction, and the narrow surface and the second side wall face each other in the horizontal direction.

In some embodiments of the present application, the battery pack further includes a heat exchange member, and the heat exchange member is disposed on one side of the battery module in the vertical direction. A size of the heat exchange member in the vertical direction is $L_3$, where $70\% \leq (L_1+L_3)/L_2 \leq 95\%$.

In some other embodiments of the present application, the battery pack further includes a heat exchange member, and the heat exchange member is disposed between adjacent battery units.

In some embodiments of the present application, $80\% \leq L_1/L_2 \leq 90\%$.

In some embodiments of the present application, the case includes an upper case cover and a lower case arranged in the vertical direction, the upper case cover is connected to the lower case, and the containing chamber is formed between the upper case cover and the lower case. The battery module is fixed to the lower case.

In some embodiments of the present application, in the vertical direction, the battery module and the upper case cover are spaced by a certain distance, and the battery module and the lower case are spaced by a certain distance.

In addition, the present application further provides a vehicle, including a vehicle body and the foregoing battery pack, the battery pack being disposed in the vehicle body.

In addition, the present application further provides a method for producing a battery pack, including: providing a case, the case being configured to have a containing chamber; and providing a battery module, the battery module being configured to be located in the containing chamber. The battery module includes a plurality of battery units arranged in a horizontal direction, and each battery unit at least includes one battery cell; a size of the battery module in the horizontal direction is larger than a size of the battery module in a vertical direction; and the size of the battery module in the vertical direction is L1, and a size of the battery pack in the vertical direction is L2, where $70\% \leq L1/L2 \leq 95\%$.

The beneficial effects of the present application are as follows: in the present application, a value of $L_1/L_2$ is set as 70%-95%, which can reduce a reserve of air inside a case, improve a response speed of a temperature control system to temperature adjustment of a battery cell, and reduce energy consumption of the temperature control system. Meanwhile, a small amount of air forms a heat insulation layer between a battery module and the case, which reduces the mutual influence of the case and the battery module on each other's temperatures, and improves an adjustment and control effect of the temperature control system on a temperature of a battery cell.

Figure 1:
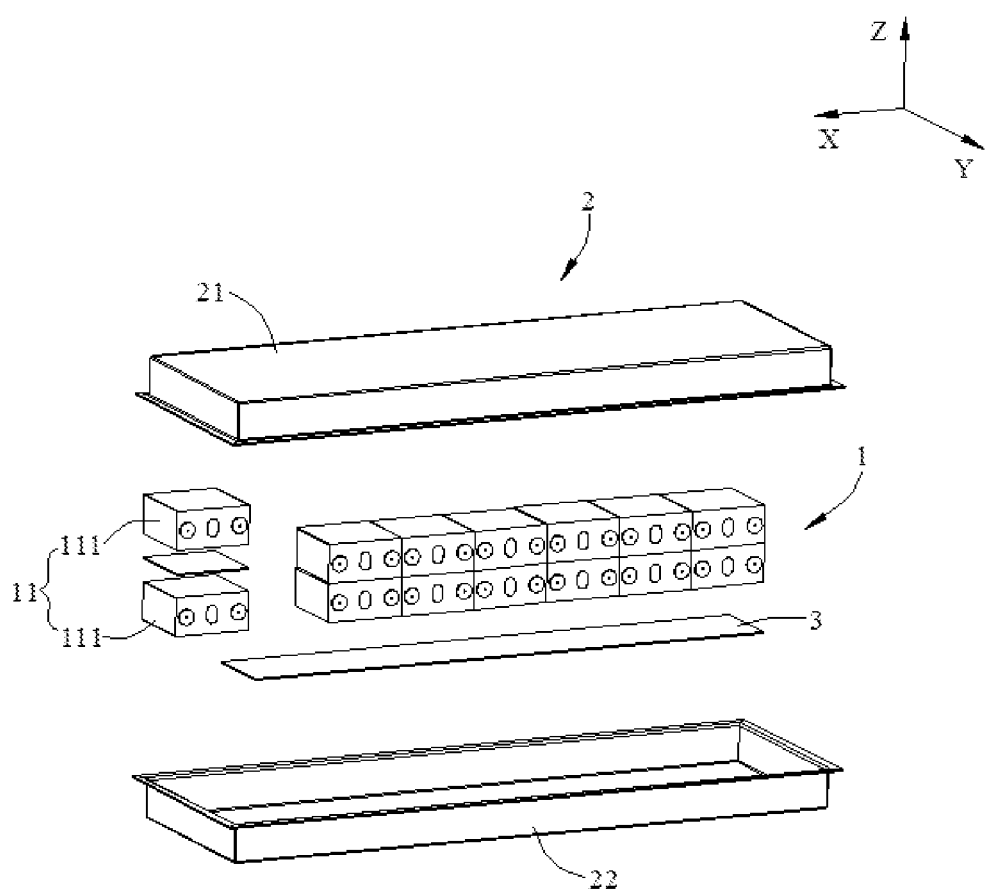
FIG. 1 is a schematic diagram of a battery pack according to the present application.

REFERENCE SIGNS ARE EXPLAINED AS FOLLOWS 1 battery module
11 battery unit
111 battery cell
112 electrode assembly
112a first electrode sheet
112b second electrode sheet
112c diaphragm
112d wide surface
112e narrow surface
113 housing
113a first side wall
113b second side wall
114 top cover assembly
114a top cover plate
114b electrode terminal
12 adhesive member
2 case
21 upper case cover
22 lower case
3 heat exchange member
X length direction
Y width direction
Z vertical direction DESCRIPTION OF EMBODIMENTS To make the objectives, technical solutions, and advantages of the present application clearer and more comprehensible, the present application will be further described below in detail with reference to the accompanying drawings and embodiments. It should be understood that the specific embodiments described herein are merely used to explain the present application, but are not intended to limit the present application.

In the description of the present application, unless otherwise specified and limited explicitly, the terms "first" and "second" are merely intended for a purpose of description, and shall not be understood as an indication or implication of relative importance. The term "a plurality of" refers to more than two (including two). Unless otherwise specified or illustrated, the term "connection" should be understood broadly, for example, the "connection" may either be a fixed connection, or a detachable connection, or an integrated connection, or an electrical connection, or a signal connection; and the "connection" may either be a direction connection, or an indirect connection through an intermediary. Those of ordinary skill in the art may appreciate the specific meanings of the foregoing terms in the present application according to specific conditions.

In the description of the specification, it should be understood that the terms representing directions such as "up" and "down" described in the embodiments of the present application are described from the angles shown in the accompanying drawings, and should not be understood as limitation on the embodiments of the present application. The present application will be further describes below in detail through the specific embodiments with reference to the accompanying drawings.

In the description of the present application, in all the accompanying drawings, a direction indicated by an arrow X is a length direction, a direction indicated by an arrow Y is a width direction, and a direction indicated by an arrow Z is a vertical direction. A horizontal direction is a direction parallel to a horizontal plane, and may either be the length direction X or the width direction Y In addition, the horizontal direction includes not only a direction absolutely parallel to the horizontal plane, but also a direction substantially parallel to the horizontal plane conventionally recognized in engineering. The vertical direction is a direction perpendicular to the horizontal plane, and the vertical direction includes not only a direction absolutely perpendicular to the horizontal plane, but also a direction substantially perpendicular to the horizontal plane conventionally recognized in engineering. In addition, the terms representing directions such as "up", "down", "top" and "bottom" described in the present application are all understood with respect to the vertical direction Z.

The present application provides a vehicle, the vehicle includes a vehicle body and a battery pack, and the battery pack is disposed in the vehicle body. The vehicle is a new energy automobile, which may be a pure electric automobile, a hybrid automobile or an extended-range automobile. The vehicle body is provided with a drive motor, the drive motor is electrically connected to the battery pack, and electric energy is provided by the battery pack. The drive motor is connected to wheels on the vehicle body through transmission mechanisms to drive the automobile to travel. Preferably, the battery pack may be horizontally disposed at a bottom of the vehicle body.

FIG. 1 is an exploded view of a battery pack according to the present application. The battery pack of the present application includes a battery module 1 and a case 2.

The case 2 includes an upper case cover 21 and a lower case 22. In FIG. 1, the upper case cover 21 and the lower case 22 are in a separated state. The upper case cover 21 and the lower case 22 may arranged in a vertical direction Z, the upper case cover 21 is connected to the lower case 22, and a containing chamber is formed between the upper case cover 21 and the lower case 22. The upper case cover 21 and the lower case 22 may be made of aluminum, aluminum alloy or other metals. A thickness of the upper case cover 21 may be 0.6 mm-3 mm, and a thickness of the lower case 22 may be 0.8 mm-2 mm.

The battery module 1 is housed in the containing chamber of the case 2. The battery module 1 may be one or more modules. When a plurality of battery modules 1 are provided, the battery modules 1 may be arranged in a length direction X or in a width direction Y.

The battery module 1 includes a plurality of battery units 11 arranged in a horizontal direction, and each battery unit 11 at least includes one battery cell 111. The battery cell 111 is a secondary battery that can be charged and discharged repeatedly. Preferably, the battery cell 111 is a lithium ion battery.

The battery module 1 further includes end plates, a binding tape and a bus bar (not shown in the figure). There are two end plates, and they are respectively disposed at two ends of the plurality of battery units 11 in the horizontal direction. The binding tape surrounds outer peripheries of the plurality of battery units 11 and the two end plates and is connected end to end, thereby fixing the battery units 11 and the end plates together. The end plates may be made of a metal material such as aluminum or aluminum alloy, or of an insulating material. The bus bar electrically connects battery cells 111 of the battery module 1. The battery module 1 may be adhered to the lower case 22.

Preferably, a size of the battery module 1 in the horizontal direction is D, a size of the battery module 1 in the vertical direction Z is $L_1$, and a value of D is greater than a value of $L_1$. Limited by a height of a chassis of a vehicle body, a size of the battery pack in the vertical direction Z is more precious. According to the present application, by arranging the battery units 11 in the horizontal direction, the sizes of the battery module 1 and the battery pack in the vertical direction Z may be reduced. By reducing the size of the battery pack in the vertical direction Z, spacing between the chassis of the vehicle body and the ground may be increased, and an obstacle crossing ability of a vehicle may be improved.

Figure 2:
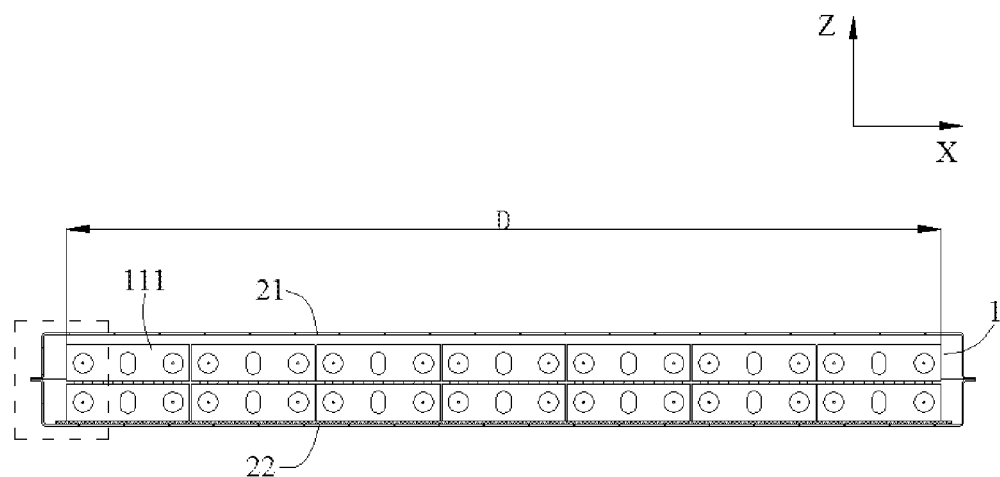
FIG. 2 is a sectional view of an embodiment of a battery pack according to the present application.
Figure 3:
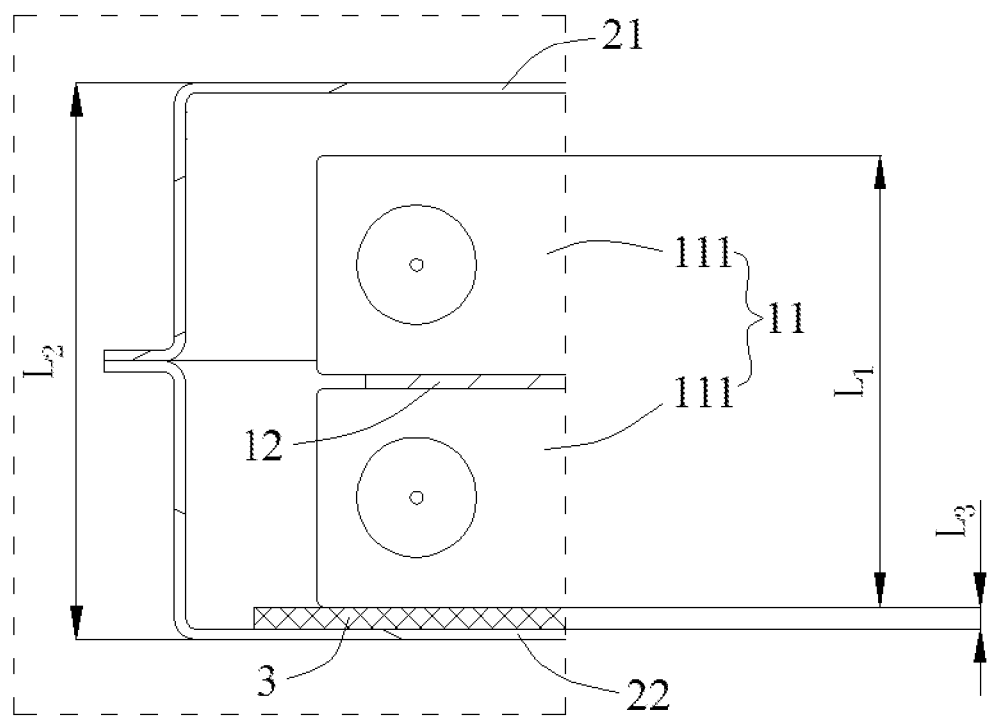
FIG. 3 is an enlarged view of a block portion of FIG. 2.

With reference to FIG. 2 and FIG. 3, a size of the battery pack in the vertical direction Z is $L_2$, $L_2$ is spacing between an upper surface of the upper case cover 21 and a lower surface of the lower case 22 in the vertical direction Z. Preferably, $70\% \leq L_1/L_2 \leq 95\%$.

In an electric automobile, the case 2 of the battery pack is exposed to the outside, a temperature of the case 2 will change with a change of an external temperature. If a value of $L_1/L_2$ is greater than 95%, spacing between the battery module 1 and the case 2 in the vertical direction Z is too small, heat exchange efficiency between them is relatively high, and a temperature of the battery module 1 is easily affected by the case 2 and an external environment. For example, when a temperature of the external environment is too low, heat of the case 2 is easily taken away by the surrounding air, and the case 2 will absorb heat of the battery cell 111, which results in that the battery cell 111 operates in a low temperature environment, and reduces performance of the battery cell 111. Similarly, when a temperature of the external environment is relatively high, the case 2 will be heated by the surrounding air, which then results in an increase of a temperature of the battery cell 111, and reduces performance of the battery cell 111.

In addition, in order to make the battery cell 111 operate in a suitable temperature environment, the battery pack is usually provided with a temperature control system. The temperature control system may heat or cool the battery cell 111 of the battery module 1, so that the battery cell 111 operates in a suitable temperature environment, which ensures operation performance and service life of the battery cell 111. However, if the value of $L_1/L_2$ is greater than 95%, the temperature of the battery cell 111 is highly affected by the external environment, and the temperature control system is not able to effectively adjust and control the temperature of the battery cell 111.

If the value of $L_1/L_2$ is less than 70%, utilization of an internal space of the case 2 is low, which results in a low energy density of the battery pack. In addition, the case 2 inside has a large reserve of air, and when the temperature control system operates, the temperature control system will change a temperature of the air in the case 2 while adjusting and controlling the temperature of the battery cell 111. Due to the large specific heat capacity of air, the large reserve of air is equivalent to an addition of a load to the temperature control system, which reduces a response speed of the temperature control system to temperature adjustment of the battery cell 111, and increases energy consumption of the temperature control system at the same time.

Therefore, in the present application, the value of $L_1/L_2$ is preferably set as 70%-95%, which can reduce the reserve of air inside the case 2, improve the response speed of the temperature control system to the temperature adjustment of the battery cell 111, and reduce the energy consumption of the temperature control system. Meanwhile, a small amount of air forms a heat insulation layer between the battery module 1 and the case 2, which reduces the mutual influence of the case 2 and the battery module 1 on each other's temperatures, and improves an adjustment and control effect of the temperature control system on the temperature of the battery cell 111.

Preferably, the value of $L_1/L_2$ is 80%-90%.

The temperature control system may include a heat exchange member 3, a temperature sensor and a control member. The heat exchange member 3 may be housed in the case 2, or integrated into a bottom wall of the lower case 22, or fixed to an outer side of the lower case 22. The heat exchange member 3 may be in direct contact with the battery cell 111, or in indirect contact with the battery cell 111 via a thermally conductive member. The temperature sensor enables monitoring of the temperature of the battery cell 111, and feeds it back to the control member. The control member instructs the heat exchange member to operate in accordance with the temperature information fed back by the temperature sensor to heat or cool the battery cell 111.

Figure 4:
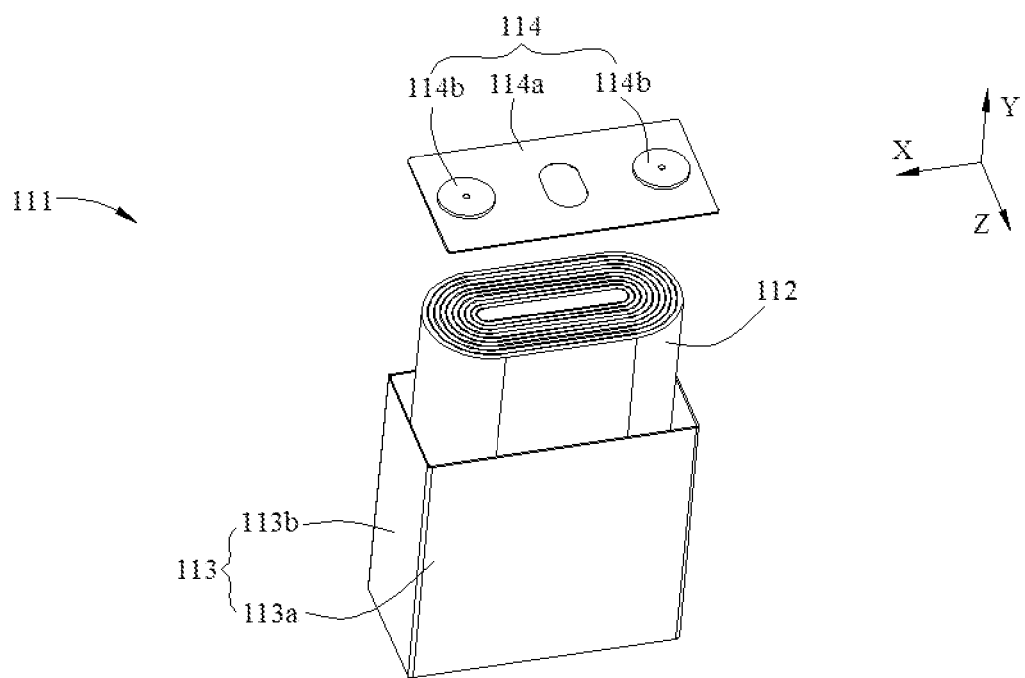
FIG. 4 is an exploded view of a battery cell according to the present application.

With reference to FIG. 4, the battery cell 111 includes an electrode assembly 112, a housing 113 and a top cover assembly 114, the electrode assembly 112 is housed in the housing 113, and the top cover assembly 114 is connected to the housing 113.

Figure 5:
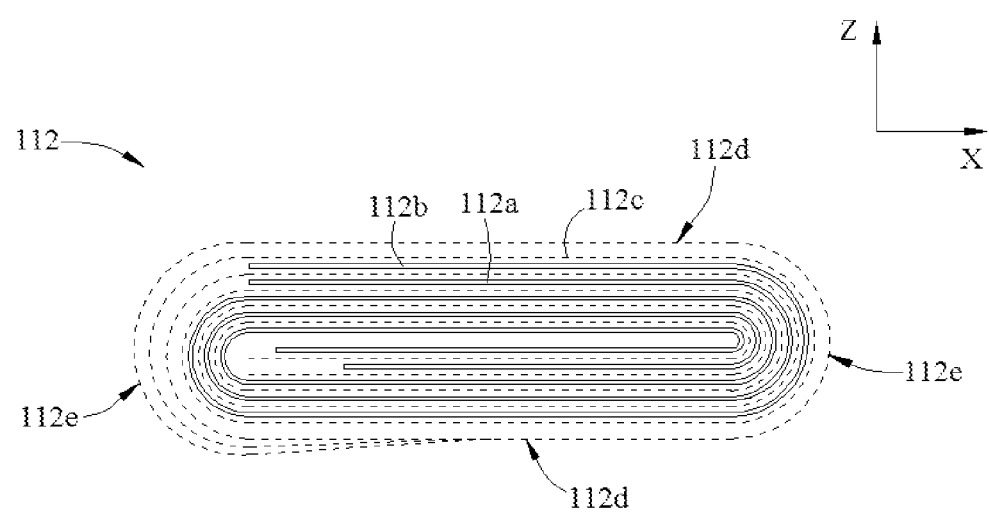
FIG. 5 is a schematic diagram of an embodiment of an electrode assembly according to the present application.

The electrode assembly 112 is a core member of the battery cell 111 for achieving charging and discharging functions. With reference to FIG. 5, the electrode assembly 112 includes a first electrode sheet 112a, a second electrode sheet 112b and a diaphragm 112c, and the diaphragm 112c isolates the first electrode sheet 112a from the second electrode sheet 112b.

The housing 113 may be made of a metal material or a composite material. For example, in an embodiment, the entire housing 113 is made of a metal material such as aluminum, aluminum alloy or nickel-plated steel. Alternatively, in another embodiment, the housing 113 may also include a base and an insulating layer. The base is made of a metal material such as aluminum, aluminum alloy or nickel-plated steel, and the insulating layer may be disposed on an outer surface of the base by coating, adhesion or the like. In this case, the metal base can ensure strength of the housing 113, and the insulating layer can improve an insulation property of the housing 113.

The housing 113 may have a hexahedral shape or another shape. The housing 113 has an opening, and the electrode assembly 112 may be placed in the housing 113 through the opening.

The top cover assembly 114 includes a top cover plate 114a and electrode terminals 114b, and the electrode terminals 114b are disposed on the top cover plate 114a. The top cover plate 114a may be made of a metal material such as aluminum or aluminum alloy, and a size of the top cover plate 114a is adapted to a size of the opening of the housing 113. The top cover plate 114a may be connected to the housing 113 by welding or the like and cover the opening of the housing 113, thereby sealing the electrode assembly 112 in the housing 113.

The electrode terminals 114b may be fixed to the top cover plate 114a by welding, riveting or the like. There are two electrode terminals 114b, and they are electrically connected to the first electrode sheet 112a and the second electrode sheet 112b, respectively.

In the electrode assembly 112, one of the first electrode sheet 112a and the second electrode sheet 112b is a positive electrode sheet, the other of the first electrode sheet 112a and the second electrode sheet 112b is a negative electrode sheet, and the diaphragm 112c is an insulator that is disposed between the positive electrode sheet and the negative electrode sheet. For example, the first electrode sheet 112a is a positive electrode sheet, and the first electrode sheet 112a includes a first current collector and a first active material layer coated on a surface of the first current collector, where the first current collector may be aluminum foil, and the first active material layer includes a ternary material, lithium manganate or lithium iron phosphate; and the second electrode sheet 112b is a negative electrode sheet, and the second electrode sheet 112b includes a second current collector and a second active material layer coated on a surface of the second current collector, where the second current collector may be copper foil, and the second active material layer includes graphite or silicon.

The housing 113 includes two first side walls 113a and two second side walls 113b, the two first side walls 113a face each other in the vertical direction Z, the two second side walls 113b face each other in the horizontal direction, and an area of the first side wall 113a is larger than an area of the second side wall 113b. Preferably, the plurality of battery units 11 are arranged in sequence in the length direction X, and correspondingly, the two second side walls 113b face each other in the length direction X. The larger first side wall 113a of the housing 113 is arranged up and down in the vertical direction Z, which can reduce a space occupied by the housing 113 in the vertical direction Z.

Each battery unit 11 may include a plurality of battery cells 111 stacked in the vertical direction Z. The number of the battery cells 111 of each battery unit 11 is preferably two or three. The number of the battery cells 111 of each battery unit 11 is much less than the number of the battery units 11, which can reduce the sizes of the battery module 1 and the battery pack in the vertical direction Z. In each battery unit 11, an adhesive member 12 is disposed between adjacent battery cells 111, and the adhesive member 12 fixedly connects the battery cells 111.

As shown in FIG. 5, in an embodiment, the electrode assembly 112 is in a coiled structure. Specifically, the first electrode sheet 112a, the second electrode sheet 112b and the diaphragm 112c are all in banded structures, the first electrode sheet 112a, the diaphragm 112c and the second electrode sheet 112b are stacked in sequence and coiled more than two turns to form the electrode assembly 112, and the electrode assembly 112 is in a flat shape. When the electrode assembly 112 is produced, the electrode assembly 112 may be coiled into a hollow cylindrical structure first, and then flattened into a flat shape after the coiling. Alternatively, the electrode assembly 112 may be coiled directly into a flat shape. FIG. 5 is a schematic diagram of an outline of an electrode assembly 112. An outer surface of the electrode assembly 112 includes two wide surfaces 112d and two narrow surfaces 112e, the two wide surfaces 112d are flat surfaces and face each other in the vertical direction Z, and the two narrow surfaces 112e face each other in the length direction X. The wide surface 112d is substantially parallel to a coiling axis of the electrode assembly 112 and is a surface with the largest area. The wide surface 112d may be a relatively flat surface, and is not required to be a pure plane. The narrow surface 112e is at least partially an arc surface. An area of the wide surface 112d is larger than an area of the narrow surface 112e.

Figure 6:
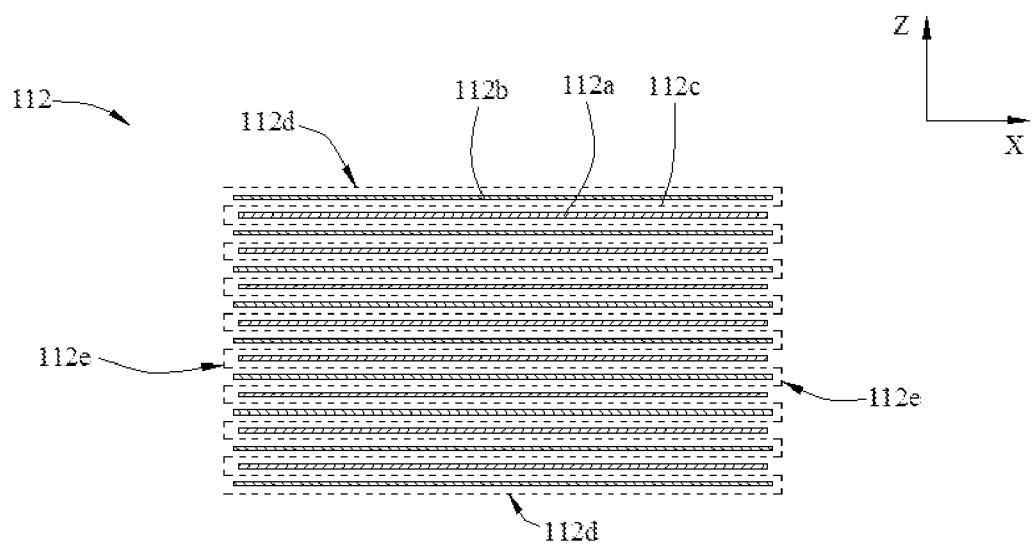
FIG. 6 is a schematic diagram of another embodiment of an electrode assembly according to the present application.

In an alternative embodiment, as shown in FIG. 6, the electrode assembly 112 is in a laminated structure. Specifically, the electrode assembly 112 includes a plurality of first electrode sheets 112a and a plurality of second electrode sheets 112b, and a diaphragm 112c is disposed between the first electrode sheet 112a and the second electrode sheet 112b. The first electrode sheet 112a, the diaphragm 112c and the second electrode sheet 112b are disposed in a stacking manner in the vertical direction Z. In the laminated structure, the first electrode sheets 112a and the second electrode sheets 112b are all sheet-shaped and substantially perpendicular to the vertical direction Z. FIG. 6 is a schematic diagram of an outline of an electrode assembly 112. An outer surface of the electrode assembly 112 includes two wide surfaces 112d and two narrow surfaces 112e, the two wide surfaces 112d face each other in the vertical direction Z, and the two narrow surfaces 112e face each other in the length direction X. The wide surface 112d is a surface with the largest area. The wide surface 112d may be a relatively flat surface, and is not required to be a pure plane. An area of the wide surface 112d is larger than an area of the narrow surface 112e.

In the coiled electrode assembly 112 or the laminated electrode assembly 112, the wide surface 112d and the first side wall 113a face each other in the vertical direction Z, and the narrow surface 112e and the second side wall 113b face each other in the horizontal direction.

During the charging and discharging processes of the electrode assembly 112, an electrode sheet will expand in its thickness direction. In the coiled electrode assembly 112 and the laminated electrode assembly 112, an expansive force in a direction perpendicular to the wide surfaces 112d is the greatest. That is, directions of the greatest expansive forces applied by the electrode assembly 112 to the first side walls 113a of the housing 113 are all toward the vertical direction Z. Correspondingly, in the horizontal direction, expansive forces applied by the electrode assembly 112 to the second side walls 113b of the housing 113 are relatively small. In the present application, the number of the battery cells 111 stacked in the vertical direction Z is relatively small, therefore, a sum of expansive forces of the plurality of battery cells 111 in the vertical direction Z is also small, and the battery cells 111 are not easily crushed. Although the number of the battery cells 111 stacked in the length direction X is relatively great, expansive forces applied by the electrode assembly 112 to the second side walls 113b in the length direction X are small. Therefore, even if the expansive forces of all the battery cells 111 in the length direction X are superimposed together, an excessive resultant force will not be generated, thereby reducing a risk of the battery cells 111 being crushed.

In the vertical direction Z, the battery module 1 and the upper case cover 21 are spaced by a certain distance, and the battery module 1 and the lower case 22 are spaced by a certain distance. In this case, the battery module 1 is not in direct contact with the upper case cover 21 and the lower case 22, thereby reducing a difference in temperature between upper and lower surfaces of the battery module 1.

The position of the heat exchange member 3 may be set according to needs. In an embodiment, the heat exchange member 3 is disposed on one side of the battery module 1 in the vertical direction Z. Preferably, the heat exchange member 3 is disposed on a lower side of the battery module 1 in the vertical direction Z, that is, the heat exchange member 3 is located between the battery module 1 and the lower case 22. The heat exchange member 3 cools or heats the battery cells 111 from the lower side, so that the battery cells 111 operate at a suitable temperature.

A size of the heat exchange member 3 in the vertical direction Z is $L_3$. Since the heat exchange member 3 also occupies a space in the vertical direction Z, in order to prevent the battery module 1 from being too close to or too far away from the upper case cover 21, preferable, 70%≤($L_1$+$L_3$)/$L_2$≤95%.

In addition, the first side wall 113a having a larger area of the housing 113 and the heat exchange member 3 face each other, which can increase heat exchange efficiency between the battery cells 111 and the heat exchange member 3, and improve a temperature control effect of the heat exchange member 3.

Figure 7:
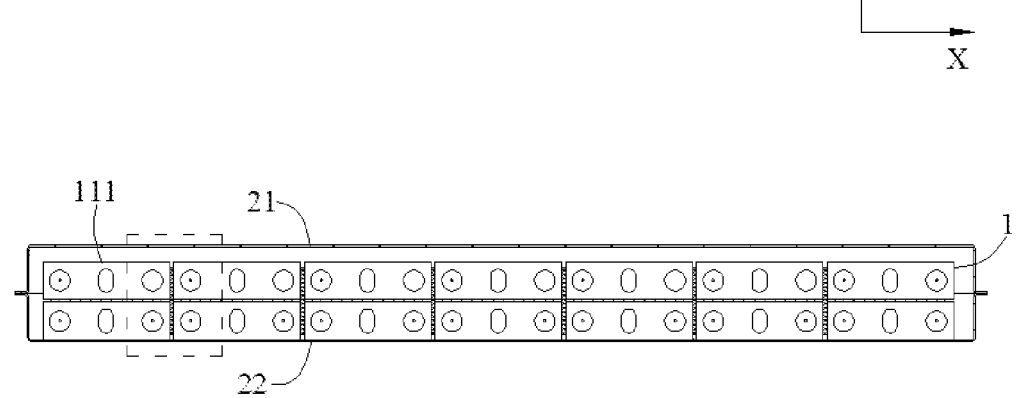
FIG. 7 is a sectional view of another embodiment of a battery pack according to the present application.
Figure 8:
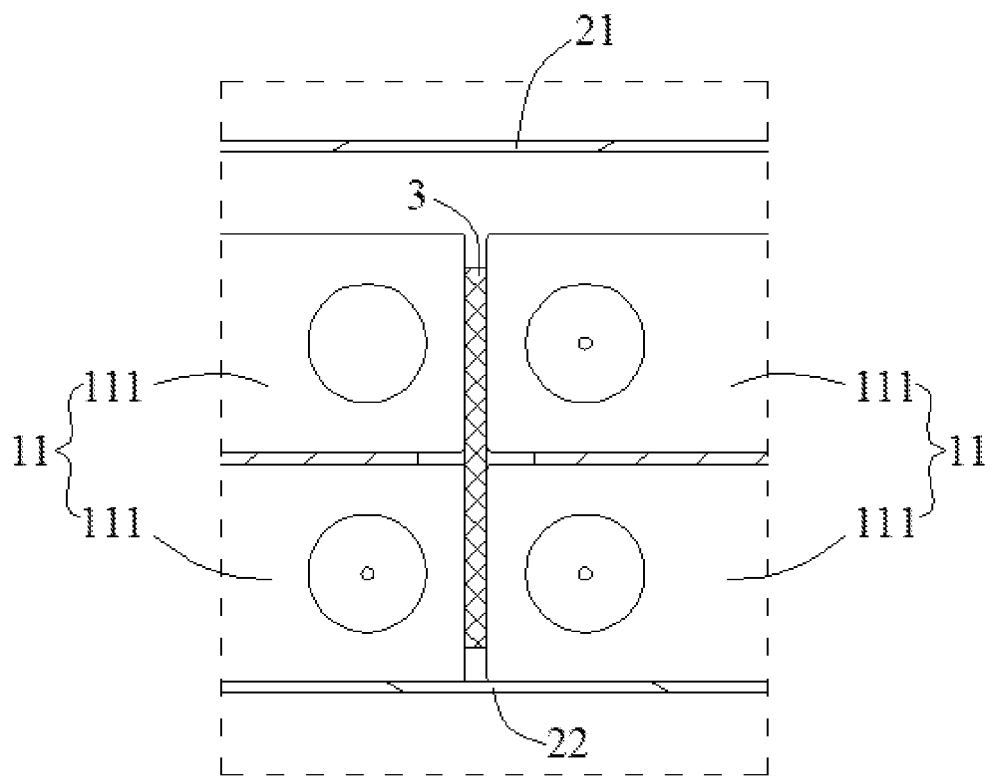
FIG. 8 is an enlarged view of a block portion of FIG. 7.

In an alternative embodiment, with reference to FIG. 7 and FIG. 8, the heat exchange member 3 may also be disposed between adjacent battery units 11. In this case, the heat exchange member 3 will not additionally occupy a space in the vertical direction Z, and the battery unit 11 may have a larger size in the vertical direction Z, thereby increasing energy density of the battery pack.

The present application will be described in detail below with reference to embodiments.

Embodiment 1 may be produced according to the following steps.
  (i) A lower case 22 is produced using a steel plate with a thickness of 1 mm, and an upper case cover 21 is produced using an aluminum plate with a thickness of 1 mm.
  (ii) A plurality of battery cells 111 are arranged together and adhered using a colloid, so that the plurality of battery cells 111 are fixed together. Then, end plates and a binding tape are disposed at outer peripheries of the plurality of battery cells 111. Finally, a bus bar is welded on electrode terminals 114b of the battery cell 111, and the bus bar electrically connects all the battery cells 111 together, thereby producing a battery module 1. A size of the battery module 1 in a width direction Y is 230 mm, a size of the battery module 1 in a length direction X is 1400 mm, and a size $L_1$ of the battery module 1 in a vertical direction Z is 120 mm.
  (iii) A heat exchange member 3 is placed on a lower side of the lower case 22 and adhered to a bottom wall of the lower case 22. The heat exchange member 3 may be a heat exchange plate, and a channel for flow of a heat exchange liquid is provided inside. The heat exchange member 3 is connected to a pipe line outside the lower case 22, and the pipe line is used for supplying the heat exchange liquid. A size $L_3$ of the heat exchange member 3 in the vertical direction Z is 3 mm.
  (iv) The battery module 1 is placed in the lower case 22 and adhered to the bottom wall of the lower case 22. The heat exchange member 3 may heat or cool the battery cells 111 through the bottom wall of the lower case 22.
  (v) The upper case cover 21 covers and is fixed to the lower case 22, thereby producing a battery pack. A containing chamber is formed between the upper case cover 21 and the lower case 22. A size of the containing chamber in the width direction Y is 240 mm, a size of the containing chamber in the length direction X is 1420 mm, and a size of the containing chamber in the vertical direction Z is 138 mm. Thicknesses of the upper case cover 21 and the lower case 22 are both 1 mm, and therefore, a size $L_2$ of the battery pack in the vertical direction Z is 140 mm.

Additionally, by changing the sizes of the upper case cover 21 and the lower case 22, the size $L_2$ of the battery pack in the vertical direction Z can be adjusted; and by changing the sizes or the number of the battery cells 111, the size $L_1$ of the battery module 1 in the vertical direction Z can be adjusted.

Embodiments 2 to 14 and comparative examples 1 to 5 adopt the same producing method as embodiment 1, and the difference is the size $L_1$ of the battery module 1 in the vertical direction Z.

Tests are performed below on embodiments 1 to 14 and comparative examples 1 to 5.

The battery pack is placed in a temperature control box, and the heat exchange member 3 in the battery pack is connected to a heat exchange pipe line. Meanwhile, a temperature sensor is installed, and the temperature sensor is used to detect a temperature of each battery cell 111 in real time.

The temperature control box is adjusted so that an ambient temperature in the temperature control box is 35° C. and is kept for one hour. Then, the heat exchange pipe line introduces a heat exchange liquid to the heat exchange member 3, where a temperature of the heat exchange liquid when it flows into the heat exchange member 3 is 20° C., and a flow rate of the heat exchange liquid is 10 L/min.

The temperature of each battery cell 111 detected by the temperature sensor is monitored and recorded, and timing is started when the heat exchange liquid is introduced. When a temperature of one battery cell 111 drops to 25° C., the time M taken by a battery cell 111 whose temperature drops to 25° C. the fastest is recorded, while a maximum difference T in temperature of all the battery cells 111 is recorded at the moment.

TABLE 1

Parameters and test results of embodiments 1 to 14 and comparative examples 1 to 5

| | $L_1$ (mm) | $L_2$ (mm) | $L_1/L_2$ | M (min) | T (° C.) |
|---|---|---|---|---|---|
| Embodiment 1 | 120 | 140 | 0.857 | 11.5 | 6.3 |
| Embodiment 2 | 123 | 140 | 0.879 | 11.9 | 6.6 |
| Embodiment 3 | 126 | 140 | 0.900 | 12.6 | 6.9 |
| Embodiment 4 | 129 | 140 | 0.921 | 13.3 | 7.4 |
| Embodiment 5 | 132 | 140 | 0.943 | 13.8 | 7.7 |
| Embodiment 6 | 133 | 140 | 0.950 | 13.9 | 7.9 |
| Embodiment 7 | 117 | 140 | 0.836 | 11.3 | 6.2 |
| Embodiment 8 | 114 | 140 | 0.814 | 11.4 | 6.4 |
| Embodiment 9 | 111 | 140 | 0.793 | 12.2 | 6.5 |
| Embodiment 10 | 108 | 140 | 0.771 | 12.8 | 6.7 |
| Embodiment 11 | 105 | 140 | 0.750 | 12.6 | 6.6 |
| Embodiment 12 | 102 | 140 | 0.729 | 13.1 | 6.7 |
| Embodiment 13 | 99 | 140 | 0.707 | 13.4 | 6.9 |
| Embodiment 14 | 98 | 140 | 0.700 | 13.9 | 7.1 |
| Comparative Example 1 | 134 | 140 | 0.957 | 14.5 | 8.5 |
| Comparative Example 2 | 135 | 140 | 0.964 | 15.3 | 8.9 |
| Comparative Example 3 | 96 | 140 | 0.686 | 15.2 | 7.1 |
| Comparative Example 4 | 90 | 140 | 0.643 | 15.9 | 7.4 |
| Comparative Example 5 | 80 | 140 | 0.571 | 16.7 | 7.5 |

In a battery pack, the larger a value of $L_1/L_2$, the smaller a distance between the battery cells 111 and the upper case cover 21, the battery cell 111 is more easily affected by the ambient temperature in the temperature control box, and correspondingly, a cooling rate of the battery cell 111 is slower. With reference to comparative examples 1 to 2, when the value of $L_1/L_2$ is greater than 0.95, the battery cell 111 is easily affected by the external high temperature, which results in a too long reaction time of the heat exchange member 3 to adjust the temperature of the battery cell 111 (for example, a value of M exceeds 14 min), and reduces performance of the battery cell 111. In addition, when the value of $L_1/L_2$ is greater than 0.95, a temperature of a battery cell 111 close to the bottom wall of the lower case 22 drops faster, and a battery cell 111 close to the upper case cover 21 is easily affected by the ambient temperature, which therefore results in a large difference in temperature between different battery cells 111 (for example, when a value of T exceeds 8° C.), and affects consistency of operation temperatures of the battery cells 111.

In a battery pack, the smaller a value of $L_1/L_2$, the greater a reserve of air inside the case 2. With reference to Embodiments 3 to 5, when the value of $L_1/L_2$ is less than 0.70, the reserve of air inside the case 2 is relatively great. In a heat exchange process, a heat exchange liquid inside the heat exchange member 3 also needs to reduce a temperature of the air inside the case 2, which therefore results in a too long reaction time of the heat exchange member 3 to adjust the temperature of the battery cell 111 (for example, a value of M exceeds 14 min), and increases energy consumption of the heat exchange member 3. In addition, air may form a heat insulation layer between the battery cells 111 and the upper case cover 21, which reduces the influence of the ambient environment on the battery cell 111. Therefore, when the value of $L_1/L_2$ is less than 0.70, a difference in temperature between the battery cells 111 may meet requirements.

It can be seen from the above that when the value of $L_1/L_2$ is too great or too small, a reaction speed of the heat exchange member 3 to adjust temperatures of the battery cells 111 will be directly affected. When the battery pack is applied to an electric automobile, the operation time of the battery cell 111 in an abnormal temperature environment will be prolonged, and performance of the battery cell 111 is reduced.

With reference to embodiments 1 to 14, in the present application, the value of $L_1/L_2$ is preferably set as 70%-95%, which can reduce a reserve of air inside the case 2, improve a response speed of the heat exchange member 3 to temperature adjustment of the battery cell 111, and reduce energy consumption of the heat exchange member 3. Meanwhile, a small amount of air forms a heat insulation layer between the battery module 1 and the case 2, which reduces the mutual influence of the case 2 and the battery module 1 on each other's temperatures, and improves an adjustment and control effect of the heat exchange member 3 on the temperature of the battery cell 111.

With reference to embodiments 1 to 14, when the value of $L_1/L_2$ is between 0.8 and 0.9, the heat exchange member 3 has a better adjustment and control effect on the temperature of the battery cell 111.

The present application further provides a method for producing a battery pack, including: providing a case, the case being configured to have a containing chamber; and providing a battery module, the battery module being configured to be located in the containing chamber. The battery module includes a plurality of battery units arranged in a horizontal direction, and each battery unit at least includes one battery cell; a size of the battery module in the horizontal direction is larger than a size of the battery module in a vertical direction; and the size of the battery module in the vertical direction is L1, and a size of the battery pack in the vertical direction is L2, where 70%≤L1/L2≤95%.

What is claimed is:

1. A battery pack, comprising a battery module and a case;
wherein the case has a containing chamber, and the battery module is located in the containing chamber;
the battery module comprises a plurality of battery units arranged in a horizontal direction, and each battery unit at least comprises one battery cell;
a size of the battery module in the horizontal direction is larger than a size of the battery module in a vertical direction; and
the size of the battery module in the vertical direction is $L_1$, and a size of the battery pack in the vertical direction is $L_2$, where 70%≤$L_1/L_2$≤95%;
wherein the battery cell comprises an electrode assembly, a housing and a top cover assembly, the electrode assembly is housed in the housing, and the top cover assembly is connected to the housing; and
the housing comprises two first side walls and two second side walls, the first side walls face each other in the vertical direction, the second side walls face each other in the horizontal direction, and an area of the first side wall is larger than an area of the second side wall;
wherein the case comprises an upper case cover and a lower case arranged in the vertical direction, the upper case cover is connected to the lower case, and the containing chamber is formed between the upper case cover and the lower case; and
the battery module is fixed to the lower case;
wherein in the vertical direction, the battery module and the upper case cover are spaced by a certain distance, and the battery module and the lower case are spaced by a certain distance.

2. The battery pack according to claim 1, wherein each battery unit comprises a plurality of battery cells stacked in the vertical direction.

3. The battery pack according to claim 1, wherein
the electrode assembly comprises a first electrode sheet, a second electrode sheet and a diaphragm, and the diaphragm isolates the first electrode sheet from the second electrode sheet;
the first electrode sheet, the diaphragm and the second electrode sheet are coiled into a flat shape, or the first electrode sheet, the diaphragm and the second electrode sheet are stacked in the vertically direction; and
the electrode assembly has two wide surfaces and two narrow surfaces, the wide surface and the first side wall face each other in the vertical direction, and the narrow surface and the second side wall face each other in the horizontal direction.

4. The battery pack according to claim 1, wherein
the battery pack further comprises a heat exchange member, and the heat exchange member is disposed on one side of the battery module in the vertical direction; and
a size of the heat exchange member in the vertical direction is $L_3$, wherein 70%≤$(L_1+L_3)/L_2$≤95%.

5. The battery pack according to claim 1, wherein the battery pack further comprises a heat exchange member, and the heat exchange member is disposed between adjacent battery units.

6. The battery pack according to claim 1, wherein 80%≤$L_1/L_2$≤90%.

7. A vehicle, comprising a vehicle body and a battery pack, the battery pack being disposed in the vehicle body, wherein the battery pack comprising a battery module and a case;
wherein the case has a containing chamber, and the battery module is located in the containing chamber;

the battery module comprises a plurality of battery units arranged in a horizontal direction, and each battery unit at least comprises one battery cell;

a size of the battery module in the horizontal direction is larger than a size of the battery module in a vertical direction; and the size of the battery module in the vertical direction is $L_1$, and a size of the battery pack in the vertical direction is $L_2$, where $70\% \leq L_1/L_2 \leq 95\%$;

wherein the battery cell comprises an electrode assembly, a housing and a top cover assembly, the electrode assembly is housed in the housing, and the top cover assembly is connected to the housing; and the housing comprises two first side walls and two second side walls, the first side walls face each other in the vertical direction, the second side walls face each other in the horizontal direction, and an area of the first side wall is larger than an area of the second side wall;

wherein the case comprises an upper case cover and a lower case arranged in the vertical direction, the upper case cover is connected to the lower case, and the containing chamber is formed between the upper case cover and the lower case; and the battery module is fixed to the lower case;

wherein in the vertical direction, the battery module and the upper case cover are spaced by a certain distance, and the battery module and the lower case are spaced by a certain distance.

8. A method for producing a battery pack, comprising:

providing a case, the case being configured to have a containing chamber; and providing a battery module, the battery module being configured to be located in the containing chamber, the battery module comprising a plurality of battery units arranged in a horizontal direction, and each battery unit at least comprising one battery cell;

wherein a size of the battery module in the horizontal direction is larger than a size of the battery module in a vertical direction; and the size of the battery module in the vertical direction is L1, and a size of the battery pack in the vertical direction is L2, wherein $70\% \leq L1/L2 \leq 95\%$;

wherein the battery cell comprises an electrode assembly, a housing and a top cover assembly, the electrode assembly is housed in the housing, and the top cover assembly is connected to the housing; and the housing comprises two first side walls and two second side walls, the first side walls face each other in the vertical direction, the second side walls face each other in the horizontal direction, and an area of the first side wall is larger than an area of the second side wall;

wherein the case comprises an upper case cover and a lower case arranged in the vertical direction, the upper case cover is connected to the lower case, and the containing chamber is formed between the upper case cover and the lower case; and the battery module is fixed to the lower case;

wherein in the vertical direction, the battery module and the upper case cover are spaced by a certain distance, and the battery module and the lower case are spaced by a certain distance.

9. The vehicle according to claim 7, wherein each battery unit comprises a plurality of battery cells stacked in the vertical direction.

10. The vehicle according to claim 7, wherein the electrode assembly comprises a first electrode sheet, a second electrode sheet and a diaphragm, and the diaphragm isolates the first electrode sheet from the second electrode sheet;

the first electrode sheet, the diaphragm and the second electrode sheet are coiled into a flat shape, or the first electrode sheet, the diaphragm and the second electrode sheet are stacked in the vertically direction; and the electrode assembly has two wide surfaces and two narrow surfaces, the wide surface and the first side wall face each other in the vertical direction, and the narrow surface and the second side wall face each other in the horizontal direction.

11. The vehicle according to claim 7, wherein the battery pack further comprises a heat exchange member, and the heat exchange member is disposed on one side of the battery module in the vertical direction; and a size of the heat exchange member in the vertical direction is $L_3$, wherein $70\% \leq (L_1+L_3)/L_2 \leq 95\%$.

12. The vehicle according to claim 7, wherein the battery pack further comprises a heat exchange member, and the heat exchange member is disposed between adjacent battery units.

13. The vehicle according to claim 7, wherein $80\% \leq L_1/L_2 \leq 90\%$.

* * * * *